(12) United States Patent
Li et al.

(10) Patent No.: US 9,921,673 B2
(45) Date of Patent: Mar. 20, 2018

(54) IN-CELL TOUCH DISPLAY PANEL

(71) Applicant: Wuhan China Star Optoelectronics Technology Co., Ltd., Wuhan (CN)

(72) Inventors: Yafeng Li, Wuhan (CN); Xiangyi Peng, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 165 days.

(21) Appl. No.: 14/912,601

(22) PCT Filed: Jan. 29, 2016

(86) PCT No.: PCT/CN2016/072779
§ 371 (c)(1),
(2) Date: Feb. 17, 2016

(87) PCT Pub. No.: WO2017/096708
PCT Pub. Date: Jun. 15, 2017

(65) Prior Publication Data
US 2017/0255308 A1    Sep. 7, 2017

(30) Foreign Application Priority Data
Dec. 7, 2015 (CN) .......................... 2015 1 0898024

(51) Int. Cl.
*G02F 1/1333* (2006.01)
*G06F 3/041* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ............... G06F 3/0412; G02F 1/13338; G02F 1/133514; G02F 1/1368; G02F 1/133345;
(Continued)

(56) References Cited

U.S. PATENT DOCUMENTS

2005/0185129 A1* 8/2005 Kim ..................... G02F 1/13394
349/156
2015/0364507 A1* 12/2015 Won ....................... G06F 3/044
257/43

(Continued)

*Primary Examiner* — Charles Chang
(74) *Attorney, Agent, or Firm* — Leong C. Lei

(57) ABSTRACT

The present invention provides an in-cell touch display panel. In the in-cell touch display panel of the present invention, a first planarization layer (14) is solely arranged between a pixel electrode (15) and source/drain electrodes (45) located on one side of a TFT substrate (1) and the pixel electrode (15) is connected through a second via (141) formed in the first planarization layer (14) to the source/drain electrodes (45) so that compared to the prior art, the thickness of two passivation layers is omitted between the pixel electrode (15) and the source/drain electrodes (45) and negative influence caused by overlapping of vias between the first passivation layer (16) and the first planarization layer (14) and between the second passivation layer (18) and the first planarization layer (14) can be eliminated, whereby there is no need to take into consideration the relationship of the first planarization layer with respect to the first passivation layer and the second passivation layer in making a design so that the aperture ratio of the pixel can be greatly increased. Further, since the number of vias formed is reduced, the structure is simple and the manufacturing difficulty is lowered down to thereby improve product yield.

17 Claims, 6 Drawing Sheets

(51) Int. Cl.
*G02F 1/1335* (2006.01)
*G02F 1/1368* (2006.01)
*G02F 1/1362* (2006.01)
*G02F 1/1343* (2006.01)
*G02F 1/1339* (2006.01)

(52) U.S. Cl.
CPC ...... *G02F 1/13394* (2013.01); *G02F 1/13439* (2013.01); *G02F 1/133345* (2013.01); *G02F 1/133512* (2013.01); *G02F 1/133514* (2013.01); *G02F 1/134309* (2013.01); *G02F 1/136209* (2013.01); *G02F 1/136286* (2013.01); *G02F 2001/13396* (2013.01); *G02F 2001/13398* (2013.01); *G02F 2001/133302* (2013.01); *G02F 2001/133357* (2013.01); *G02F 2201/121* (2013.01); *G02F 2201/123* (2013.01); *G02F 2202/104* (2013.01)

(58) Field of Classification Search
CPC ......... G02F 1/136209; G02F 1/134309; G02F 1/136286; G02F 1/13439; G02F 1/133512; G02F 1/13394; G02F 2001/133357; G02F 2201/121; G02F 2201/123; G02F 2202/104; G02F 2201/13398; G02F 2001/13396; G02F 2001/133302
USPC ........................................................ 349/138
See application file for complete search history.

(56) References Cited

U.S. PATENT DOCUMENTS

2016/0187693 A1\* 6/2016 Woo .................... G02F 1/13338
257/72
2017/0038887 A1\* 2/2017 Zhang ............... G02F 1/136227

\* cited by examiner

IN-CELL TOUCH DISPLAY PANEL

BACKGROUND OF THE INVENTION

1. Field of the Invention

The present invention relates to the field of display technology, and in particular to an in-cell touch display panel.

2. The Related Arts

The rapid progress of the display technology makes touch display panels widely accepted and used by people. For example, smart phones and tablet computers are involved with the use of touch display panels. The touch display panel adopts embedding techniques to combine a touch panel and a liquid crystal display panel as a unity with the functionality of the touch panel embedded in the liquid crystal display panel so that the liquid crystal display panel possesses both functions of displaying and detecting touch inputs. The touch display panel can be classified as on-cell type, in-cell type, and externally-attached type according to the structure thereof. Among them, the in-cell type features the advantages of low cost, being ultra thin, and slim bezel and is majorly used in high-end touch products and is becoming the primary goal of future development of the touch control technology.

A liquid crystal display panel is generally composed of a color filter (CF) substrate, an thin-film transistor (TFT) array substrate, and a liquid crystal layer arranged between the two substrates and the operation principle thereof is that a drive voltage is applied to the two glass substrates to control the rotation of the liquid crystal molecules of the liquid crystal layer in order to refract out light from a backlight module for generating an image.

Low-temperature poly-silicon (LTPS) techniques are new generation technology for manufacturing TFTs. Compared to the traditional amorphous silicon (a-Si) technology, the LTPS displays have a relatively fast response speed and possess advantages such as high brightness, high definition, and low power consumption. Since the LTPS has an advantage of high mobility, the ratio of a channel with (W) to a channel length (L) of TFT substrate switch can be made extremely small in designing a pixel. This makes the aperture ratio of the pixel relatively high, providing an extremely high advantage in market competition.

Referring to FIG. 1, a cross-sectional view is given to illustrate the structure of a conventional in-cell touch display panel. The in-cell touch display panel comprises a TFT substrate 100, a CF substrate 200 that is opposite to the TFT substrate 100, and a liquid crystal layer 300 located between the TFT substrate 100 and the CF substrate 200.

The TFT substrate 100 comprises a first base plate 110, a light-shielding layer 120 arranged on the first base plate 110, a first insulation layer 130 arranged on the first base plate 110 and the light-shielding layer 120, a poly-silicon layer 410 arranged on the first insulation layer 130, a second insulation layer 420 arranged on the first insulation layer 130 and the poly-silicon layer 410, a gate electrode 430 arranged on the second insulation layer 420, a third insulation layer 440 arranged on the second insulation layer 420 and the gate electrode 430, source/drain electrodes 450 arranged on the third insulation layer 430, a first planarization layer 140 arranged on the third insulation layer 440 and the source/drain electrodes 450, a common electrode 150 arranged on the first planarization layer 140, a first passivation layer 160 arranged on the common electrode 150, a touch detection electrode layer 170 arranged on the first passivation layer 160, a second passivation layer 180 arranged on the first passivation layer 160 and the touch detection electrode layer 170, and a pixel electrode 190 arranged on the second passivation layer 180.

As shown in FIG. 2, the TFT substrate 100 further comprises a data line 510 arranged on the third insulation layer 440. The light-shielding layer 120 shields, in the horizontal direction, the poly-silicon layer 410, the gate electrode 430, and the source/drain electrodes 450 entirely and also partly shields the data line 510.

As shown in FIG. 3, the first planarization layer 140, the first passivation layer 160, and the second passivation layer 180 are respectively provided with a first via 141, a second via 161, and a third via 181 penetrating each other. The pixel electrode 190 is made in connection with the source/drain electrodes 450 through the first via 141, the second via 161, and the third via 181.

To connect the pixel electrode 190 to the source/drain electrodes 450, before the pixel electrode 190 is deposited, three holing operations must be respectively conducted in the first planarization layer 140, the first passivation layer 160, and the second passivation layer 180. This makes it necessary to take into consideration the influences caused by the variation of line width (critical dimension, CD) and overlaying, whereby the attempt to increase aperture ratio would be constrained. In addition, holing operations are some of the most complicated operations involved in a manufacturing process and this would greatly increase the difficulty of manufacturing and affecting product yield.

SUMMARY OF THE INVENTION

An object of the present invention is to provide an in-cell touch display panel, wherein a thin-film transistor (TFT) substrate comprises only a planarization layer between a pixel electrode and source/drain electrodes and the pixel electrode is made in contact with the source/drain electrodes through a single via formed in the planarization layer so that the structure is simple and a relatively high pixel aperture ration may be obtained.

To achieve the above object, the present invention provides an in-cell touch display panel, which comprises a TFT substrate, a color filter (CF) substrate opposite to the TFT substrate, and a liquid crystal layer between the TFT substrate and the CF substrate;

wherein the TFT substrate comprises a first base plate, a light-shielding layer formed on the first base plate, a first insulation layer formed on the first base plate and the light-shielding layer, a TFT layer formed on the first insulation layer, a first planarization layer formed on the TFT layer, a pixel electrode formed on the first planarization layer, a first passivation layer formed on the pixel electrode, a touch detection electrode layer formed on the first passivation layer, a second passivation layer formed on the first passivation layer and the touch detection electrode layer, and a common electrode formed on the second passivation layer; and the second passivation layer comprises a first via formed therein and corresponding to the touch detection electrode layer, the common electrode being connected, through the first via, to the touch detection electrode layer; and the TFT layer comprises source/drain electrodes, and the first planarization layer comprises a second via formed therein and corresponding to the source/drain electrodes, the pixel electrode being connected, through the second via, to the source/drain electrodes.

The TFT layer comprises a poly-silicon layer formed on the first insulation layer, a second insulation layer formed on the first insulation layer and the poly-silicon layer, a gate electrode formed on the second insulation layer, a third insulation layer formed on the second insulation layer and the gate electrode, and the source/drain electrodes that are formed on the third insulation layer.

The TFT layer further comprises a data line formed on the third insulation layer.

The light-shielding layer shields and covers, in a horizontal direction, the poly-silicon layer, the gate electrode, and the source/drain electrodes entirety and shields and covers the data line partly; and the light-shielding layer is formed of a metallic material.

The first insulation layer, the second insulation layer, the third insulation layer are each a silicon nitride, a silicon oxide, or a combined composite layer thereof.

The common electrode and the pixel electrode are formed of a material comprising indium tin oxide.

The CF substrate comprises a second base plate, a black matrix formed on the second base plate, a color resist layer formed on the second base plate and the black matrix, a second planarization layer formed on the color resist layer, and photo-spacers formed on the second planarization layer.

The photo-spacers comprises a primary photo-spacer and a secondary photo-spacer; the primary photo-spacer is in contact engagement with the second passivation layer and the secondary photo-spacer defines a gap with respect to the common electrode.

The first base plate and the second base plate are glass substrates.

The color resist layer comprises a red color resist layer, a green color resist layer, and a blue color resist layer.

The present invention also provides an in-cell touch display panel, which comprises a TFT substrate, a CF substrate opposite to the TFT substrate, and a liquid crystal layer between the TFT substrate and the CF substrate;

wherein the TFT substrate comprises a first base plate, a light-shielding layer formed on the first base plate, a first insulation layer formed on the first base plate and the light-shielding layer, a TFT layer formed on the first insulation layer, a first planarization layer formed on the TFT layer, a pixel electrode formed on the first planarization layer, a first passivation layer formed on the pixel electrode, a touch detection electrode layer formed on the first passivation layer, a second passivation layer formed on the first passivation layer and the touch detection electrode layer, and a common electrode formed on the second passivation layer; and the second passivation layer comprises a first via formed therein and corresponding to the touch detection electrode layer, the common electrode being connected, through the first via, to the touch detection electrode layer; and the TFT layer comprises source/drain electrodes, and the first planarization layer comprises a second via formed therein and corresponding to the source/drain electrodes, the pixel electrode being connected, through the second via, to the source/drain electrodes;

wherein the TFT layer comprises a poly-silicon layer formed on the first insulation layer, a second insulation layer formed on the first insulation layer and the poly-silicon layer, a gate electrode formed on the second insulation layer, a third insulation layer formed on the second insulation layer and the gate electrode, and the source/drain electrodes that are formed on the third insulation layer;

wherein the common electrode and the pixel electrode are formed of a material comprising indium tin oxide; and wherein the CF substrate comprises a second base plate, a black matrix formed on the second base plate, a color resist layer formed on the second base plate and the black matrix, a second planarization layer formed on the color resist layer, and photo-spacers formed on the second planarization layer.

The efficacy of the present invention is as follows:

The present invention provides an in-cell touch display panel, in which a first planarization layer on one side of a TFT substrate carries a pixel electrode formed thereon; a first passivation layer is formed on the first planarization layer and the pixel electrode, and the first passivation layer carries a touch detection electrode layer formed thereon; a second passivation layer is formed on the first passivation layer and the touch detection electrode layer and the second passivation layer carries a common electrode formed thereon; wherein the common electrode is connected through a first via formed in the second passivation layer to the touch detection electrode layer; the first planarization layer is solely arranged between the pixel electrode and the source/drain electrodes and the pixel electrode is connected through a second via formed in the first planarization layer to the source/drain electrodes so that compared to the prior art, the thickness of two passivation layers is omitted between the pixel electrode and the source/drain electrodes and negative influence caused by overlapping of vias between the first passivation layer and the first planarization layer and between the second passivation layer and the first planarization layer can be eliminated, whereby there is no need to take into consideration the relationship of the first planarization layer with respect to the first passivation layer and the second passivation layer in making a design so that the aperture ratio of the pixel can be greatly increased. Further, since the number of vias formed is reduced, the structure is simple and the manufacturing difficulty is lowered down to thereby improve product yield.

BRIEF DESCRIPTION OF THE DRAWINGS

The technical solution, as well as other beneficial advantages, of the present invention will become apparent from the following detailed description of an embodiment of the present invention, with reference to the attached drawings.

In the Drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
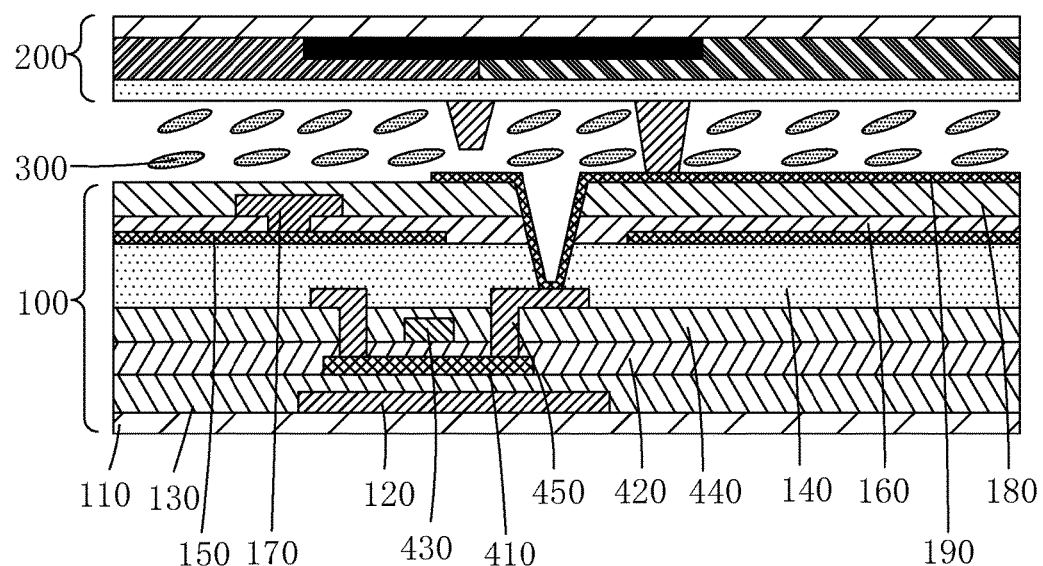
FIG. 1 is a cross-sectional view showing a site of a conventional in-cell touch display panel where vias between a pixel electrode and source/drain electrodes are formed.
Figure 2:
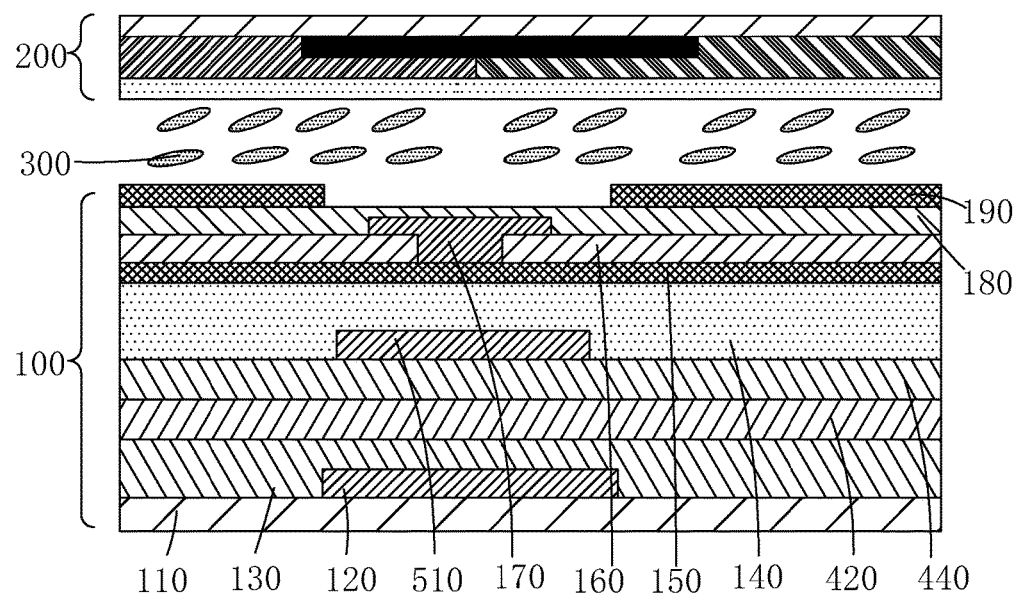
FIG. 2 is a cross-sectional view showing a site of the in-cell touch display panel of FIG. 1, where a data line is located.
Figure 3:
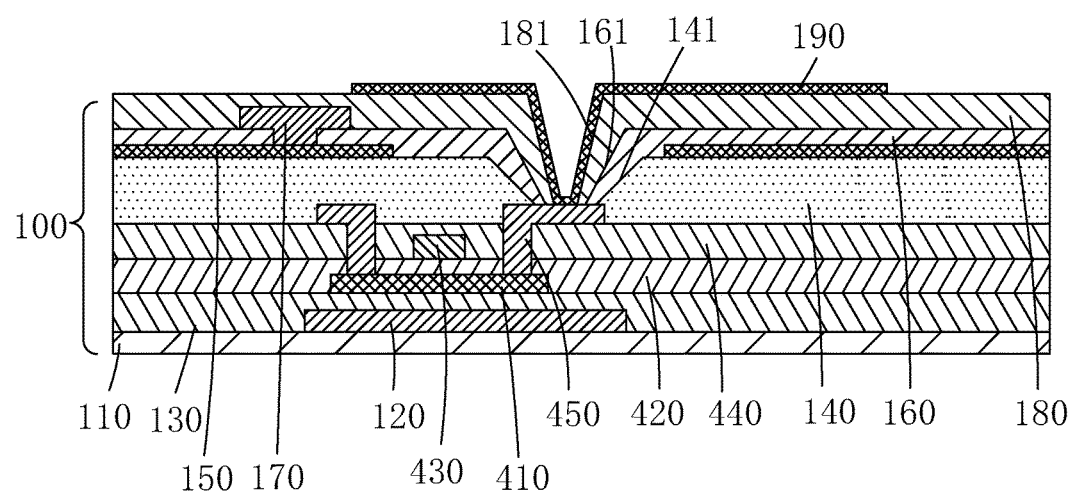
FIG. 3 is a cross-sectional view showing a site of a thin-film transistor (TFT) substrate of the in-cell touch display panel of FIG. 1, where the vias between the pixel electrode and the source/drain electrodes are formed.
Figure 4:
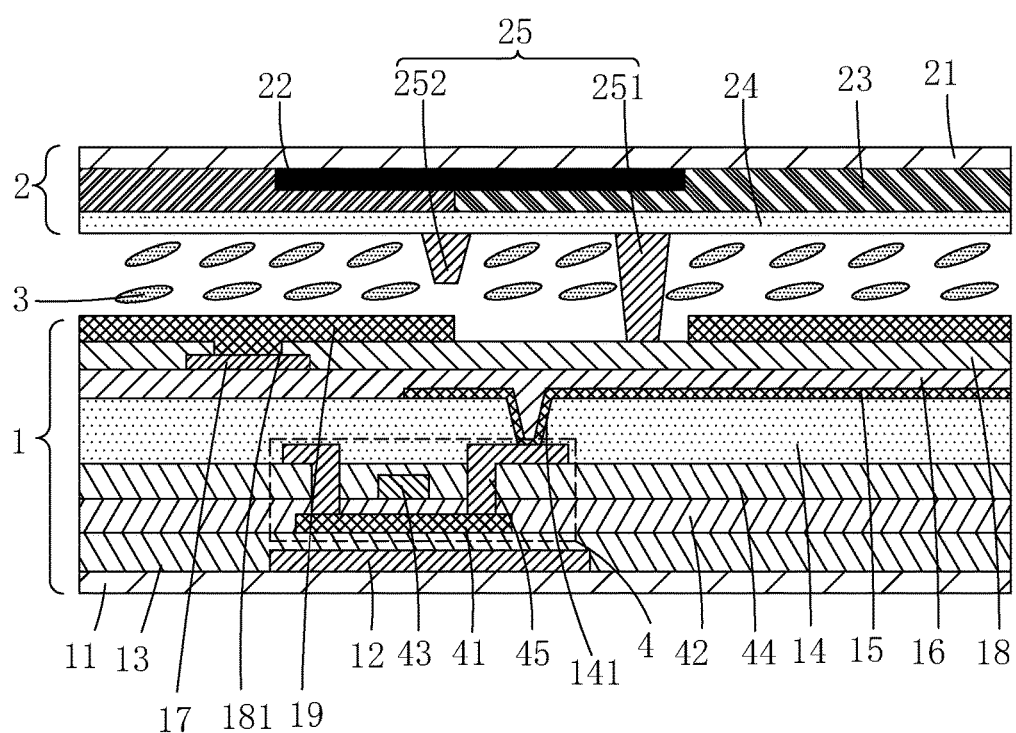
FIG. 4 is a cross-sectional view showing a site of an in-cell touch display panel according to the present invention, where a via between a pixel electrode and source/drain electrodes is formed.
Figure 5:
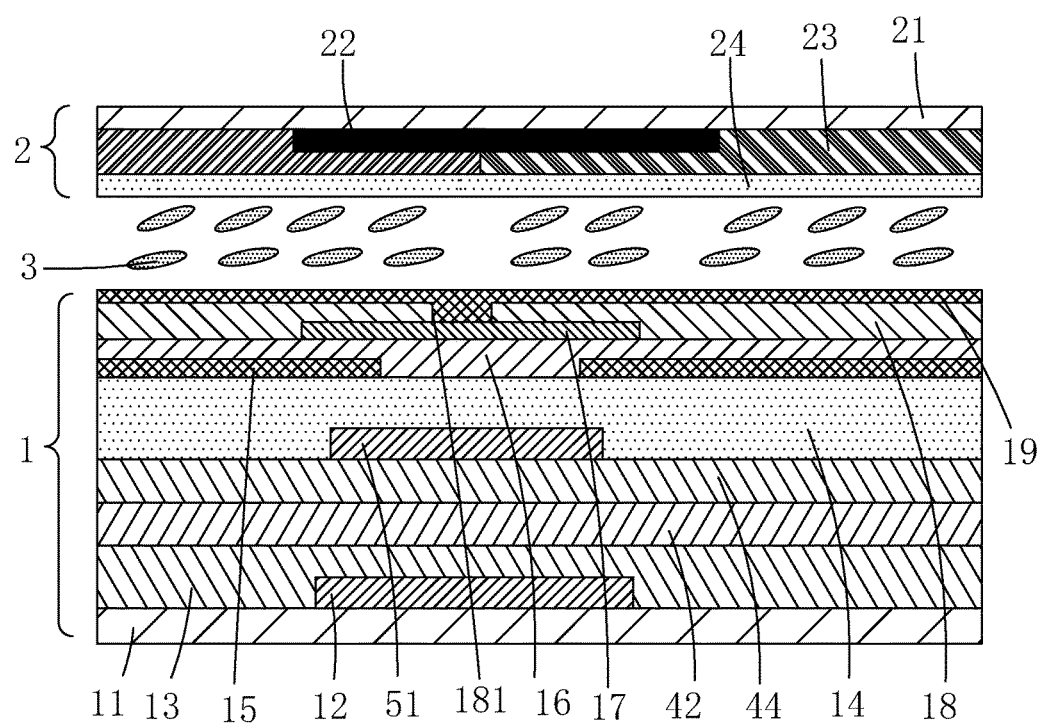
FIG. 5 is a cross-sectional view showing a site of the in-cell touch display panel according to the present invention, where a data line is located.
Figure 6:
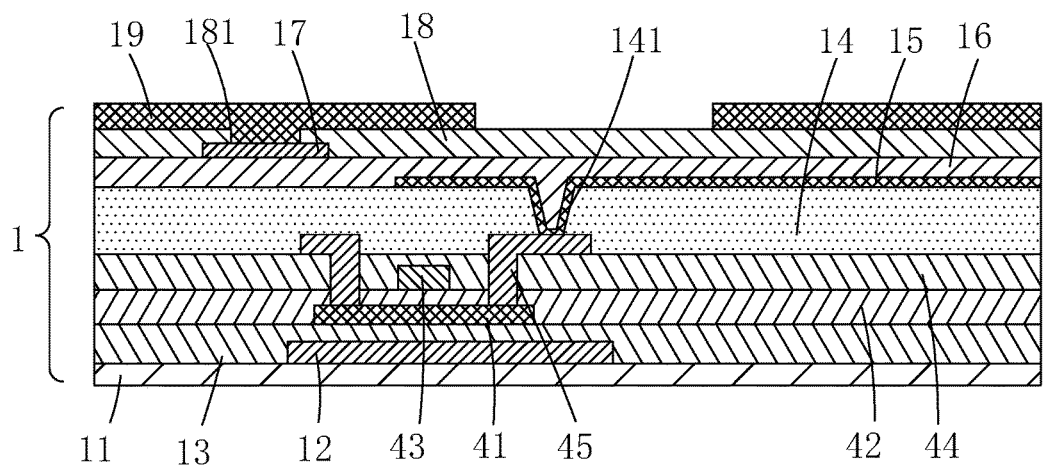
FIG. 6 is a cross-sectional view showing a site of a TFT substrate of the in-cell touch display panel according to the present invention, where the via between the pixel electrode and the source/drain electrodes is formed.

Referring to FIGS. 4-6, the present invention provides an in-cell touch display panel, which comprises a thin-film transistor (TFT) substrate 1, a color filter (CF) substrate 2 opposite to the TFT substrate 1, and a liquid crystal layer 3 located between the TFT substrate 1 and the CF substrate 2.

The TFT substrate 1 comprises a first base plate 11, a light-shielding layer 12 formed on the first base plate 11, a first insulation layer 13 formed on the first base plate 11 and the light-shielding layer 12, a TFT layer 4 formed on the first insulation layer 13, a first planarization layer 14 formed on the TFT layer 4, a pixel electrode 15 formed on the first planarization layer 14, a first passivation layer 16 formed on the pixel electrode 15, a touch detection electrode layer 17 formed on the first passivation layer 16, a second passivation layer 18 formed on the first passivation layer 16 and the touch detection electrode layer 17, and a common electrode 19 formed on the second passivation layer 18.

The second passivation layer 18 comprises a first via 181 formed therein and corresponding to the touch detection electrode layer 17. The common electrode 19 is connected, through the first via 181, to the touch detection electrode layer 17. The TFT layer 4 comprises source/drain electrodes 45, and the first planarization layer 14 comprises a second via 141 formed therein and corresponding to the source/drain electrodes 45. The pixel electrode 15 is connected, through the second via 141, to the source/drain electrodes 45.

Since there is only the first planarization layer 14 existing between the pixel electrode 15 and the source/drain electrodes 45, the pixel electrode 15 is allowed to connect, through the second via 141 of the first planarization layer 14, to the source/drain electrodes 45 so that compared to the prior art, two passivation layers are omitted between the pixel electrode 15 and the source/drain electrodes 45 and negative influence caused by holing between the first passivation layer 16 and the first planarization layer 14, and that between the second passivation layer 18 and the first planarization layer 14 can be eliminated, whereby there is no need to take into consideration the relationship of the first planarization layer 14 with respect to the first passivation layer 16 and the second passivation layer 18 in making a design so that the aperture ratio of the pixel can be greatly increased. Further, since the number of vias formed is reduced, the structure is simple and the manufacturing difficulty is lowered down to thereby improve product yield.

Specifically, the TFT layer 4 comprises a poly-silicon layer 41 formed on the first insulation layer 13, a second insulation layer 42 formed on the first insulation layer 13 and the poly-silicon layer 41, a gate electrode 43 formed on the second insulation layer 42, a third insulation layer 44 formed on the second insulation layer 42 and the gate electrode 43, and the source/drain electrodes 45 that are formed on the third insulation layer 44.

As shown in FIG. 5, the TFT layer 4 further comprises a data line 51 formed on the third insulation layer 44.

Specifically, the light-shielding layer 12 shields and covers, in the horizontal direction, the poly-silicon layer 41, the gate electrode 43, and the source/drain electrodes 45 entirety and also shields and covers the data line 51 partly. Specifically, the light-shielding layer 12 is formed of a metallic material.

Specifically, the first insulation layer 13, the second insulation layer 42, and the third insulation layer 44 are each a silicon nitride ($SiN_x$) layer, a silicon oxide ($SiO_x$) layer, or a combined composite layer thereof.

Specifically, the common electrode 19 and the pixel electrode 15 are formed of a material comprising indium tin oxide (ITO).

Specifically, the CF substrate 2 comprises a second base plate 21, a black matrix 22 formed on the second base plate 21, a color resist layer 23 formed on the second base plate 21 and the black matrix 22, a second planarization layer 24 formed on the color resist layer 23, and photo-spacers 25 formed on the second planarization layer 24.

Specifically, the photo-spacers 25 include a primary photo-spacer 251 and a secondary photo-spacer 252. The primary photo-spacer 251 is in contact engagement with the second passivation layer 18 and the secondary photo-spacer 252 defines a gap with respect to the common electrode 19.

Specifically, the first base plate 11 and the second base plate 12 are glass substrates.

Specifically, the color resist layer 34 comprises a red color resist layer, a green color resist layer, and a blue color resist layer.

In summary, the present invention provides an in-cell touch display panel, in which a first planarization layer on one side of a TFT substrate carries a pixel electrode formed thereon; a first passivation layer is formed on the first planarization layer and the pixel electrode, and the first passivation layer carries a touch detection electrode layer formed thereon; a second passivation layer is formed on the first passivation layer and the touch detection electrode layer and the second passivation layer carries a common electrode formed thereon; wherein the common electrode is connected through a first via formed in the second passivation layer to the touch detection electrode layer; the first planarization layer is solely arranged between the pixel electrode and the source/drain electrodes and the pixel electrode is connected through a second via formed in the first planarization layer to the source/drain electrodes so that compared to the prior art, the thickness of two passivation layers is omitted between the pixel electrode and the source/drain electrodes and negative influence caused by overlapping of vias between the first passivation layer and the first planarization layer and between the second passivation layer and the first planarization layer can be eliminated, whereby there is no need to take into consideration the relationship of the first planarization layer with respect to the first passivation layer and the second passivation layer in making a design so that the aperture ratio of the pixel can be greatly increased. Further, since the number of vias formed is reduced, the structure is simple and the manufacturing difficulty is lowered down to thereby improve product yield.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An in-cell touch display panel, comprising a thin-film transistor (TFT) substrate, a color filter (CF) substrate opposite to the TFT substrate, and a liquid crystal layer between the TFT substrate and the CF substrate;

wherein the TFT substrate comprises a first base plate, a light-shielding layer formed on the first base plate, a first insulation layer formed on the first base plate and the light-shielding layer, a TFT layer formed on the first insulation layer, a first planarization layer formed on the TFT layer, a pixel electrode formed on the first planarization layer, a first passivation layer formed on the pixel electrode, a touch detection electrode layer formed on the first passivation layer, a second passivation layer formed on the first passivation layer and the touch detection electrode layer, and a common electrode formed on the second passivation layer; and
the second passivation layer comprises a first via formed therein and corresponding to the touch detection electrode layer, the common electrode being connected, through the first via, to the touch detection electrode layer; and the TFT layer comprises source/drain electrodes, and the first planarization layer comprises a second via formed therein and corresponding to the source/drain electrodes, the pixel electrode being connected, through the second via, to the source/drain electrodes;
wherein the CF substrate is spaced from the TFT substrate in a predetermined direction and the first planarization layer, the first passivation layer, and the second passivation layer are stacked in order on each other in the predetermined direction, the pixel electrode being interposed between the first passivation layer and the first planarization layer and connected through the second via to the source/drain electrodes, the touch detection electrode layer being interposed between the first passivation layer and the second passivation layer and connected through the first via to the common electrode, wherein the touch detection electrode layer is located under the common electrode and above the pixel electrode in the predetermined direction and is isolated from the pixel electrode and the source/drain electrodes by the first passivation layer.

2. The in-cell touch display panel as claimed in claim 1, wherein the TFT layer comprises a poly-silicon layer formed on the first insulation layer, a second insulation layer formed on the first insulation layer and the poly-silicon layer, a gate electrode formed on the second insulation layer, a third insulation layer formed on the second insulation layer and the gate electrode, and the source/drain electrodes that are formed on the third insulation layer.

3. The in-cell touch display panel as claimed in claim 2, wherein the first insulation layer, the second insulation layer, the third insulation layer are each a silicon nitride, a silicon oxide, or a combined composite layer thereof.

4. The in-cell touch display panel as claimed in claim 2, wherein the TFT layer further comprises a data line formed on the third insulation layer.

5. The n-cell touch display panel as claimed in claim 4, wherein the light-shielding layer shields and covers, in a horizontal direction, the poly-silicon layer, the gate electrode, and the source/drain electrodes entirety and shields and covers the data line partly; and the light-shielding layer is formed of a metallic material.

6. The in-cell touch display panel as claimed in claim 1, wherein the common electrode and the pixel electrode are formed of a material comprising indium tin oxide.

7. The in-cell touch display panel as claimed in claim 1, wherein the CF substrate comprises a second base plate, a black matrix formed on the second base plate, a color resist layer formed on the second base plate and the black matrix, a second planarization layer formed on the color resist layer, and photo-spacers formed on the second planarization layer.

8. The in-cell touch display panel as claimed in claim 7, wherein the photo-spacers comprises a primary photo-spacer and a secondary photo-spacer; the primary photo-spacer is in contact engagement with the second passivation layer and the secondary photo-spacer defines a gap with respect to the common electrode.

9. The in-cell touch display panel as claimed in claim 7, wherein the first base plate and the second base plate are glass substrates.

10. The in-cell touch display panel as claimed in claim 7, wherein the color resist layer comprises a red color resist layer, a green color resist layer, and a blue color resist layer.

11. An in-cell touch display panel, comprising a thin-film transistor (TFT) substrate, a color filter (CF) substrate opposite to the TFT substrate, and a liquid crystal layer between the TFT substrate and the CF substrate;
wherein the TFT substrate comprises a first base plate, a light-shielding layer formed on the first base plate, a first insulation layer formed on the first base plate and the light-shielding layer, a TFT layer formed on the first insulation layer, a first planarization layer formed on the TFT layer, a pixel electrode formed on the first planarization layer, a first passivation layer formed on the pixel electrode, a touch detection electrode layer formed on the first passivation layer, a second passivation layer formed on the first passivation layer and the touch detection electrode layer, and a common electrode formed on the second passivation layer; and
the second passivation layer comprises a first via formed therein and corresponding to the touch detection electrode layer, the common electrode being connected, through the first via, to the touch detection electrode layer; and the TFT layer comprises source/drain electrodes, and the first planarization layer comprises a second via formed therein and corresponding to the source/drain electrodes, the pixel electrode being connected, through the second via, to the source/drain electrodes;
wherein the CF substrate is spaced from the TFT substrate in a predetermined direction and the first planarization layer, the first passivation layer, and the second passivation layer are stacked in order on each other in the predetermined direction, the pixel electrode being interposed between the first passivation layer and the first planarization layer and connected through the second via to the source/drain electrodes, the touch detection electrode layer being interposed between the first passivation layer and the second passivation layer and connected through the first via to the common electrode, wherein the touch detection electrode layer is located under the common electrode and above the pixel electrode in the predetermined direction and is isolated from the pixel electrode and the source/drain electrodes by the first passivation layer;
wherein the TFT layer comprises a poly-silicon layer formed on the first insulation layer, a second insulation layer formed on the first insulation layer and the poly-silicon layer, a gate electrode formed on the second insulation layer, a third insulation layer formed on the second insulation layer and the gate electrode, and the source/drain electrodes that are formed on the third insulation layer;
wherein the common electrode and the pixel electrode are formed of a material comprising indium tin oxide; and
wherein the CF substrate comprises a second base plate, a black matrix formed on the second base plate, a color resist layer formed on the second base plate and the black matrix, a second planarization layer formed on the color resist layer, and photo-spacers formed on the second planarization layer.

12. The in-cell touch display panel as claimed in claim 11, wherein the TFT layer further comprises a data line formed on the third insulation layer.

13. The in-cell touch display panel as claimed in claim 12, wherein the light-shielding layer shields and covers, in a horizontal direction, the poly-silicon layer, the gate electrode, and the source/drain electrodes entirety and shields and covers the data line partly; and the light-shielding layer is formed of a metallic material.

14. The in-cell touch display panel as claimed in claim 11, wherein the first insulation layer, the second insulation layer, the third insulation layer are each a silicon nitride, a silicon oxide, or a combined composite layer thereof.

15. The in-cell touch display panel as claimed in claim 11, wherein the photo-spacers comprises a primary photo-spacer and a secondary photo-spacer; the primary photo-spacer is in contact engagement with the second passivation layer and the secondary photo-spacer defines a gap with respect to the common electrode.

16. The in-cell touch display panel as claimed in claim 11, wherein the first base plate and the second base plate are glass substrates.

17. The in-cell touch display panel as claimed in claim 11, wherein the color resist layer comprises a red color resist layer, a green color resist layer, and a blue color resist layer.

* * * * *